United States Patent [19]
Sloyan

[11] 3,753,542
[45] Aug. 21, 1973

[54] MACHINERY BASE WITH SLIDABLE CARRIAGE HAVING SLUE COUNTERACTING MEANS

[76] Inventor: Jerome J. Sloyan, c/o Automatic Motor Base Co., Windsor, N.J. 08561

[22] Filed: June 16, 1971

[21] Appl. No.: 153,622

[52] U.S. Cl. ........................... 248/23, 74/242.13 A
[51] Int. Cl. ........................................ F16m 11/04
[58] Field of Search .................. 248/23, 429, 430; 267/127, 11, 12; 280/6, 11; 74/242.13 A, 242.14 R

[56] References Cited
UNITED STATES PATENTS

| | | |
|---|---|---|
| 3,184,208 | 5/1965 | Tanoka .......................... 248/429 |
| 3,090,611 | 5/1963 | Schultze .......................... 267/11 |
| 1,000,974 | 8/1911 | Anderson ..................... 74/242.13 A |
| 1,387,849 | 8/1921 | Gross .......................... 74/242.14 R |

*Primary Examiner*—J. Franklin Foss
*Attorney*—Howard P. King

[57] ABSTRACT

A machinery base having a slidable carriage movably responsive to tension variation of a belt at one side thereof between driving and driven pulleys, is provided with means automatically activating the sliding impulse simultaneously to the other side of the carriage remote from the pulley side thereof so the carriage will be impelled evenly at both sides thereof, thereby eliminating tendency of the carriage to slue.

2 Claims, 6 Drawing Figures

Patented Aug. 21, 1973

INVENTOR.
JEROME J. SLOYAN
BY
Howard P. King

ATTORNEY

INVENTOR.
JEROME J. SLOYAN

BY
Howard P. King

ATTORNEY

Patented Aug. 21, 1973

INVENTOR.
JEROME J. SLOYAN

BY Howard P. King

ATTORNEY

MACHINERY BASE WITH SLIDABLE CARRIAGE HAVING SLUE COUNTERACTING MEANS

Rotational impulse to a driven pulley of a driven piece of equipment or mechanism customarily is derived from a motor through the agency of a driving pulley at one side of the motor in conjunction with a driving belt from one pulley to the other. At least one of the machines, namely, either the motor or the driven equipment, is mounted on a slidable carriage, and in the present showing, it is the motor that has been arbitrarily selected to be so mounted. To serve its purpose, the belt is subject to wide variation of tension, namely from slack condition to severe driving tension under heavy load conditions. The carriage responds with a sliding motion. Inasmuch as the pulley is located at a side of the machine mounted on the carriage, the tension tends to slue the carriage on its supporting rails as the carriage is moved. This sluing of the carriage is accentuated and aggrevated more especially in the larger types of machinery bases where the pulley of the carriage-mounted machine is located grossly non-symmetrically to the sides of the carriage. The non-symmetric condition is increased in those situations where the pulley shaft of the machine mounted on the carriage is on a jury shaft extension of the motor or other machine, the effect of which materially increases the sluing moments of force of the carriage on the rails and thereby not only results in misalignment of the pulleys but also increases the friction and wear on the slidable bearings and rails. The invention provides means for automatically overcoming the sluing of the carriage in operation.

THE DRAWINGS

DESCRIPTION

Figure 1:
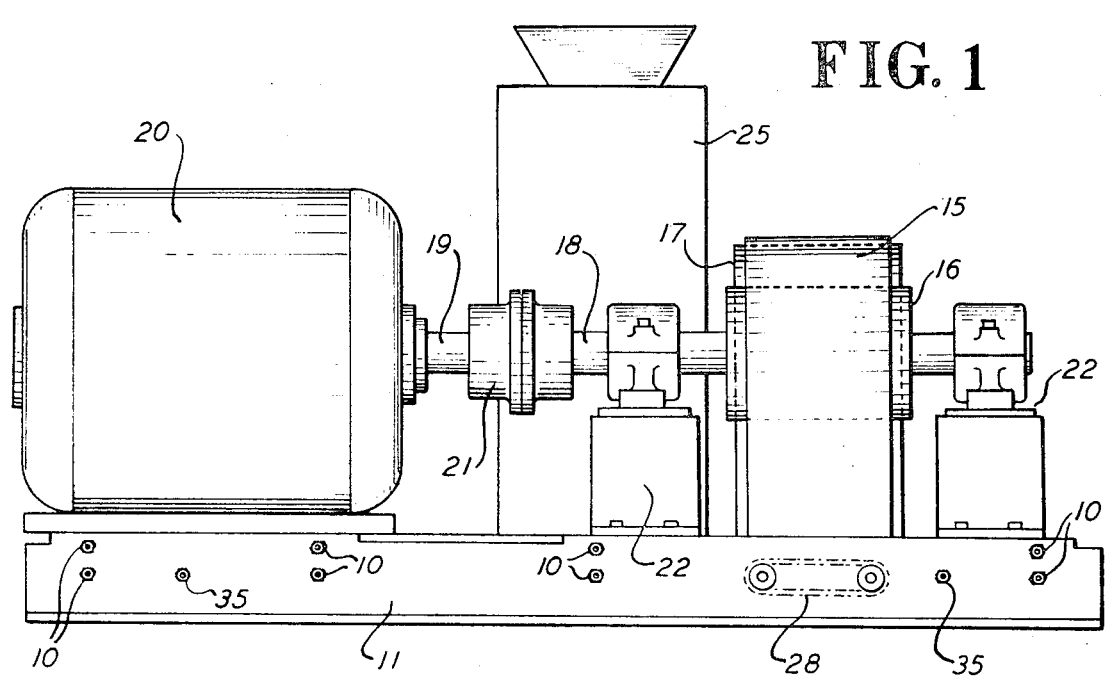
FIG. 1 is a front view of a machinery base of this invention in use.
Figure 2:
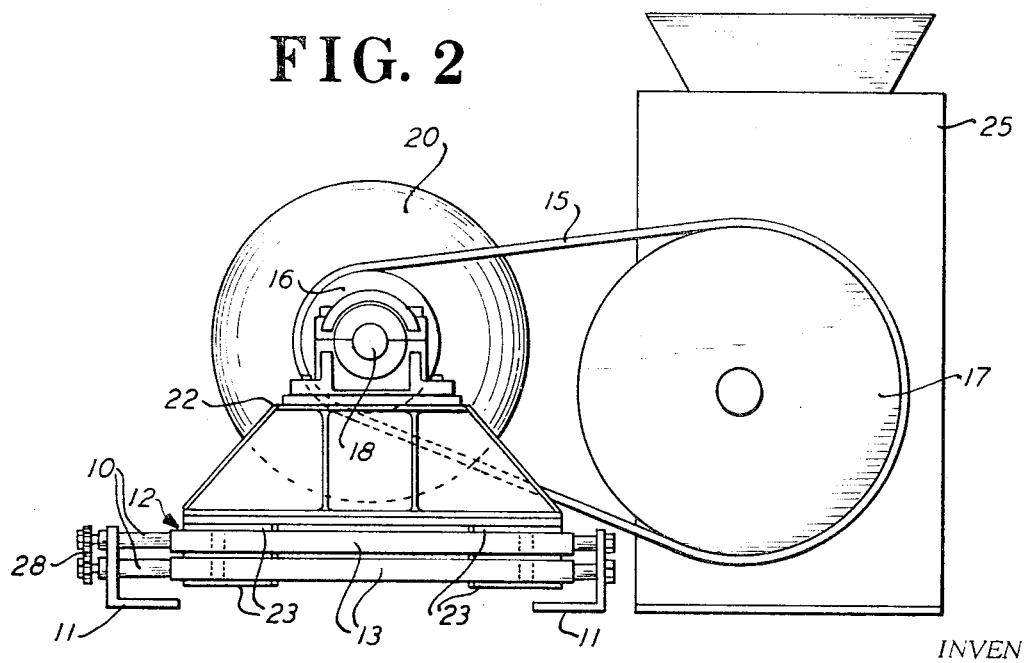
FIG. 2 is an end view thereof and showing belt drive from a driving pulley to a driven pulley of an operated example of equipment.

The invention is employed in combination with bases to be found in the prior art which secure rails 10 at their ends in upstanding leaves of fixed angle-irons 11 wherein the rails are parallel to each other and the angle irons are parallel to each other and perpendicular to the rails thereby forming a rigid rectangular basal structure. As many rails as needed and in selected arrangement may be employed, and in view of the heavy duty character of the equipment, the rails are here illustrated arranged in pairs, one rail of the pair above the other, and in addition to a pair proximate to each end of the angle irons, there may also be other intermediate pairs.

A slidable carriage 12 is carried by the rails through agency of tubular bearings 13 constituted as integral parts of the carriage. Springs 14 parallel to the rails are provided for actuating the carriage in a direction tending to tighten a belt 15 applied over driving and driven pulleys 16, 17 of which the driving pulley 16 is here shown upon a jury shaft 18 aligned with motor shaft 19 of motor 20. The shafts are unified by an intervening flexible coupling 21 and the jury shaft is rotatably mounted on pillow blocks 22 which are made fast at the end portion of carriage cross-members 23 on which, at the other end portions, said motor 20 is secured. Thus the driving pulley 16 is proximate to one end of the carriage so it is preferable to situate the said springs 14 also proximate to the same end of the carriage. Rotatable but longitudinally fixed screws 24 within the springs provide means such as non-rotatable but slidable nut 26, for compressing the springs and apply desired amount of tension on belt 15 to operate driven pulley 17 of the utilitarian piece of equipment 25. As a consequence of this unsymmetrical application of sliding forces as applied to the carriage, a very considerable sluing moment of force exists.

Figure 3:
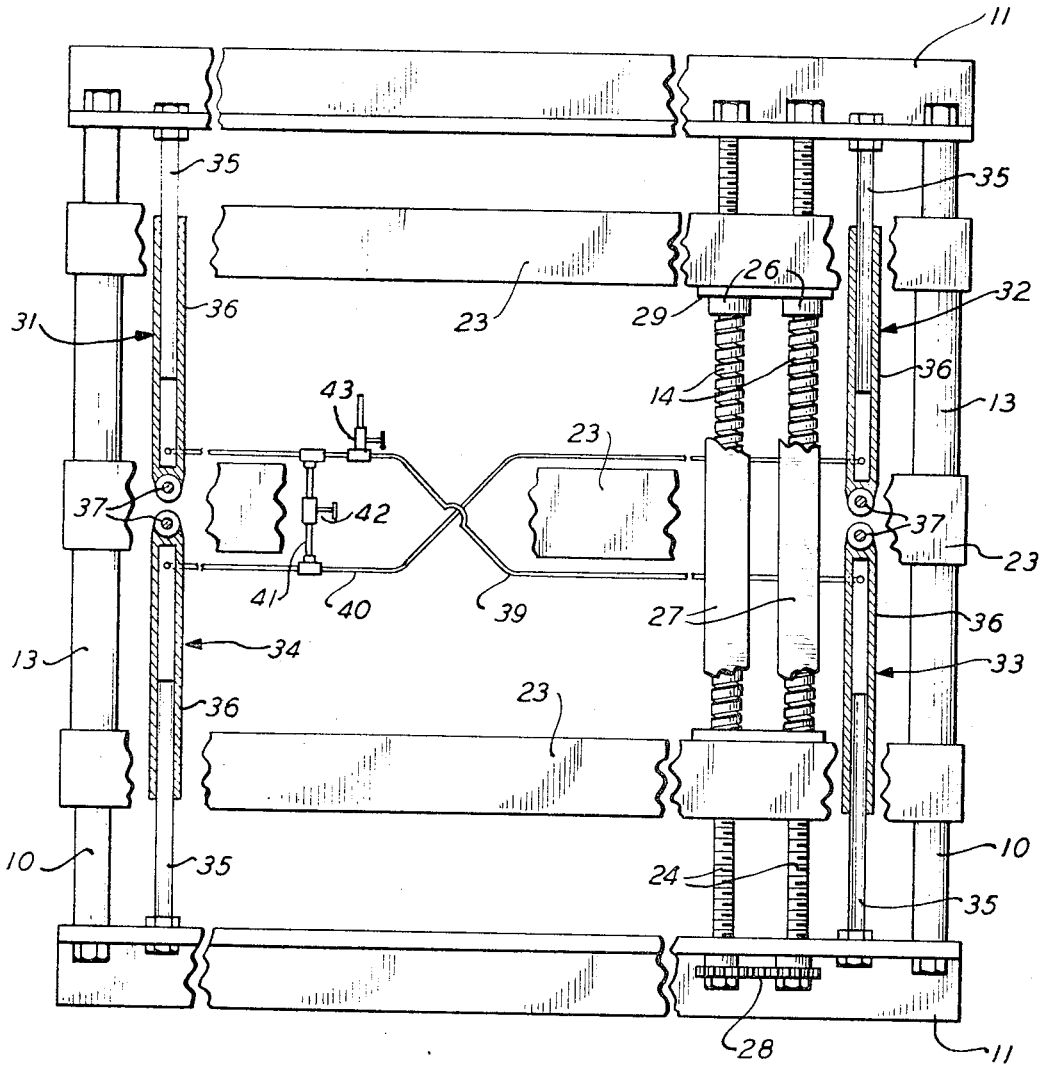
FIG. 3 is a plan, with the several fluid tubes in section, showing the base alone and with the carriage thereof located under condition of the belt being slack.

It may be further explained that the springs are contained in square tubular housings 27 and slidably retain follower nut 26 from turning when screw 24 which is accessible at the outer side of angle iron 11, is rotated. As two adjusting screws 24 are indicated, they, or as many more as elected to be used may be simultaneously actuated by sprocket and chain 28 interconnection. The carriage provides a seat 29 which will be ultimately engaged by the follower nut when rotating the screws counter-clockwise, as shown in FIG. 3, after which continued rotation will produce slack in the belt.

Figure 6:
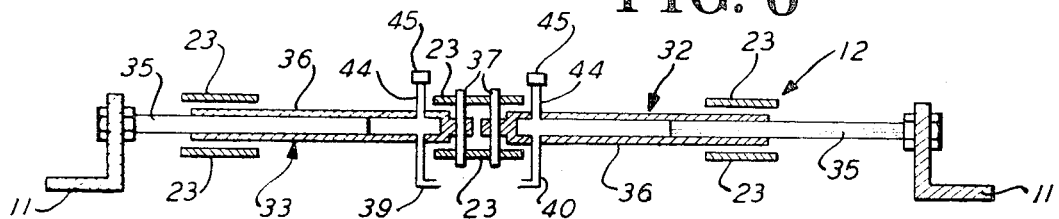
FIG. 6 is a sectional view taken on line VI—VI of FIG. 4.

Proximate to each corner of the base there is a slue-counteracting mechanism for convenience of reference individually identified by numerals 31, 32, 33 and 34, the even-numbered ones of which are at diagonally opposite corners and the odd-numbered ones of which are at the other two diagonally opposite corners. Each of said mechanisms comprises a rod-like plunger 35 appropriately secured to a respective angle iron 11 and projecting inwardly of the base parallel to and near the rail or rails proximate to the respective side of the carriage. Each plunger 35 projects individually onto a movable cylinder 36 providing, with closure effected by the plunger, a fluid-containing chamber, the fluid preferably being a non-compressible liquid. The end of the cylinder remote from the plunger is closed and transversely there through is an upright pin 37 the ends whereof are carried in a medial pair of upper and lower cross-members 23 of the carriage. It is therefore the cylinders that move when the carriage moves. Each pair of diagonally opposite cylinder chambers are connected by pipes 39 and 40. (The odd-numbered pipe connects the odd-numbered cylinders and the even-numbered pipe connects the even-numbered cylinders.) Normally the two pipes do not communicate with each other, but in order to charge the entire system with the liquid, a by-pass pipe 41 may be provided with a shut-off valve 42 included therein which is kept closed during normal operation. A suitable valved fitting 43 is provided somewhere in the piping through which to initially introduce the operating liquid. The lengths of cylinders and plungers are correlated so that when the carriage is in either of its extreme positions, where the plungers are in their extreme outward position with respect to their cylinders, enough remains within its cylinder to provide a lateral support, and where the plungers are in their extreme inward position that their ends do not contact the closed ends of their respective cylinders. To avoid air pockets during filling vent pipes 44 (see FIG. 6) may be provided and closed with caps 45 after filling the system with liquid.

OPERATION

Figure 4:
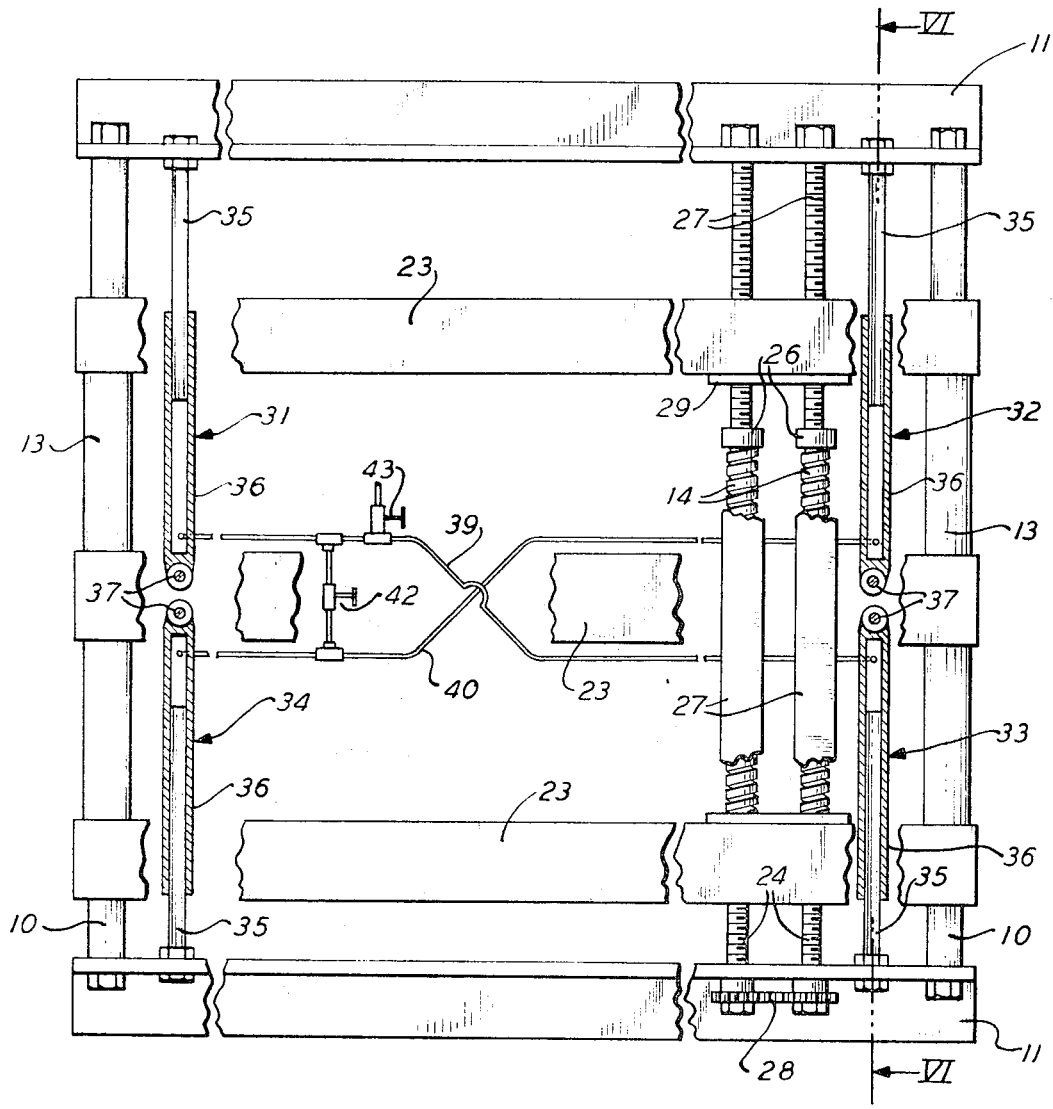
FIG. 4 is a corresponding plan under condition of the belt operating under normal load.

Having filled the hydraulic system, closed the inlet and by-pass valve, and applied the vent caps in place, the mechanisms 31–34 are in condition to function automatically. The driving and driven machines are secured in place and with the carriage 12 in its rearward position, shown in FIG. 3, the belt 15 is applied to pulleys 16 and 17 and will at that time be in somewhat slack condition. Follower nut 26 is in contact with seat 29 and spring 14 is expanded to normal length and therefor is not exerting any force tending to slide the carriage or tighten the belt. Since the hydraulic cylinders are attached to the carriage, they likewise are in a rearward position which consequentially results in the fluid-containing portions of the chambers of the two rearward mechanisms 31, 32 are in shortened or contracted condition as compared to the fluid-containing chamber length of the front two mechanisms 33, 34. If and when the carriage is moved to a more forward position, fluid will be forced from the chambers of the forward mechanisms and will enter the chambers of the rearward mechanisms. Such movement of the carriage is obtained by rotating adjusting screw 24 clockwise thereby advancing follower nut 26 which compresses spring 14 which applies sliding impetus to slide the carriage toward the front and in so doing progressively introduces tension in the belt 15. Eventually a point will be reached when all slack in the belt has been eliminated and the belt tension resists any further movement of the carriage even as more compression is applied to the springs by continued rotation of the adjusting screw. This situation may be considered as normal condition for operation and has been theoretically attained with the positioning of parts as illustrated in FIG. 4. In this condition for normal loads, the force exerted by the spring compression is equal and opposite to the force exerted by the belt tension and suffices to actuate the driven machine without slippage of the belt on either pulley.

The above-described movement of the carriage from position shown in FIG. 3 to the position shown in FIG. 4, simultaneously forced fluid from the chamber of the right-hand forward mechanism 33 next to the belt side to pass under pressure through pipe 39 to the diagonally opposite rear mechanism 31 to occupy a space volume equal to the space volume displaced from the said front mechanism and consequently causes the side of the carriage remote from the pulley to move forward a distance equal to the spring-propelled movement of the side of the carriage nearest to the pulley, thereby overcoming tendency which the carriage otherwise would be subjected to from one-sided or unsymmetrical actuation. Since all of the chambers have identical internal diameters and all move equal distances, the fluid transferred from one to entry into the other mechanism is exactly the same, hence both sides of the carriage must necessarily move simultaneously and for precisely equal distances. Movement in a reverse direction would be similarly obtained by transfer of liquid from the chamber of the rearward mechanism 32 through pipe 40 to the chamber diagonally opposite thereto at the forward side of the carriage remote from the pulley.

Figure 5:
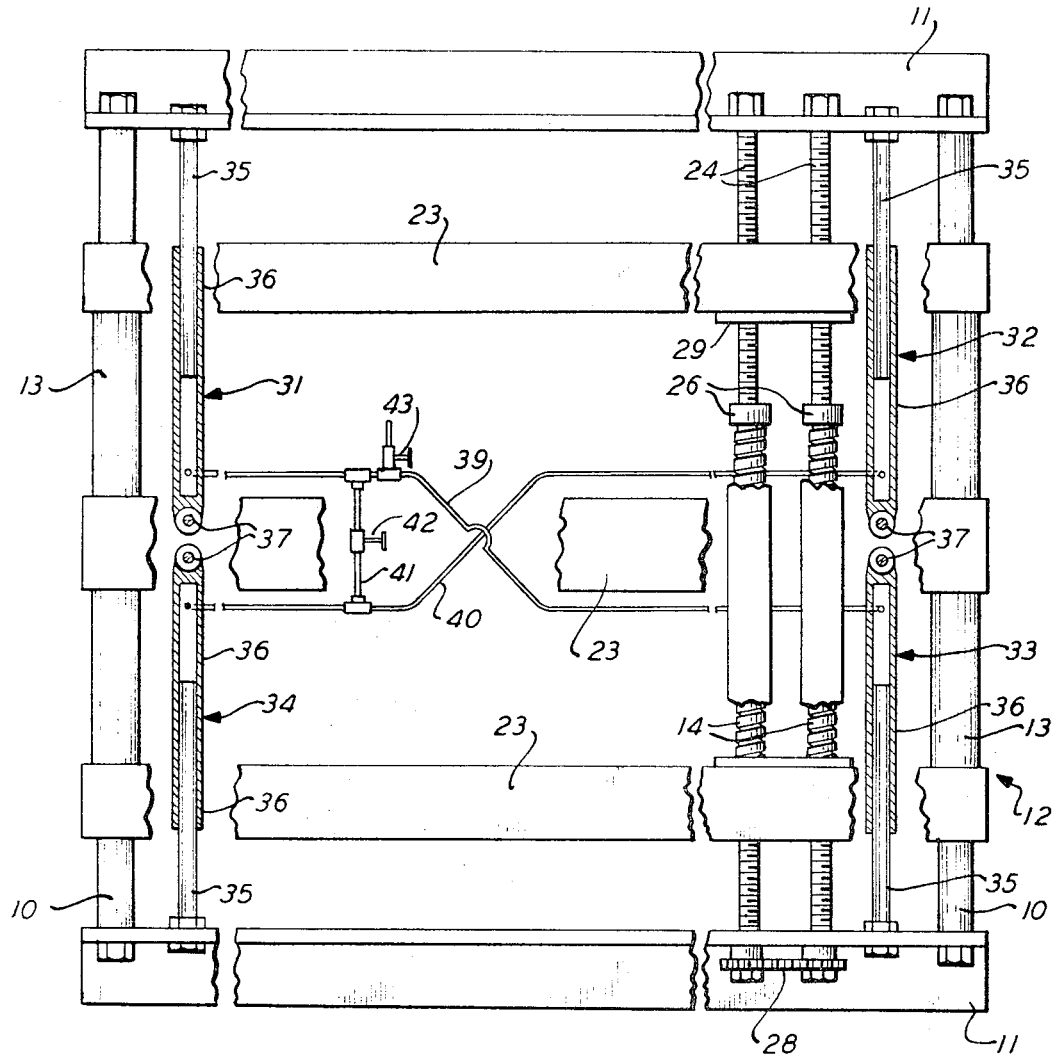
FIG. 5 is another corresponding plan under condition of more intense load on the belt.

Now let it be assumed that the load on the machine is increased, and in order to serve as a better illustration, that the increase is substantial and occurs suddenly. To handle this increased load, the belt will have to exert more effort, more force, but the springs, temporarily at least, exert only the same force as they did under normal load. Because the force exerted by the belt is the greater, and is being applied adjacent to the pulley side of the carriage, were it not for the hydraulic system which has been provided, it is quite likely that sluing would occur as the pulley side of the carriage would be moved toward the rear. Whereas the side remote from the pulley, if it did move, would not accelerate at the same rate as the pulley side. As the pulley side of the carriage is being moved toward the rear, that movement is increasing the compression of the springs. When the springs are sufficiently compressed to exert a force equal to the force now exerted by the belts, the carriage will come to rest. This situation of advancement under the more severe load condition is shown in FIG. 5 as having taken place.

It should be kept in mind that when the previously mentioned forces are equal, the carriage will remain at rest. When one of the forces becomes greater than the other, movement of the carriage in the direction of the greater force will result. However, since the force which causes the movement is applied adjacent to the pulley side, and a substantial amount of weight is mounted adjacent to the other side of the carriage, movement of the pulley side would be the first to occur in the absence of the present invention. In view of the foregoing, the description of the operation of the hydraulic systems begins at either the upper or lower cylinder on the right side of the carriage depending upon the direction at which the said greater force is applied to the carriage.

It is now believed clear that any increment of movement of the pulley side of the carriage toward the rear, will be accompanied by an equal increment of movement of cylinder 36 of mechanism 32 and in the same direction, and by an equal decrease in the liquid filled length of the chamber of that chamber. To obtain such a decrease, the displaced fluid is forced through pipe 40 to the diagonally opposite mechanism 34 at the front of the carriage at the side remote from the pulley creating pressure in the chamber thereof reacting to urge that side of the carriage to move rearwardly simultaneously and in equal amount and same direction as the increment of movement produced at the pulley side of the carriage.

While the above-described forceful corrective operation was taking place, it may be observed that the other rear mechanism 31 was also experiencing a reduction in liquid filled length of its chamber, but since it is connected by pipe 39 to the diagonally opposite rearward mechanism 33 wherein the available fluid space is increasing due to movement ascribed to the pulley side of the carriage, the displaced fluid from the rear mechanism 31 readily transfers to said forward mechanism 33 with little, if any, force being required to effect the transfer.

The above described increment has been shown in FIG. 5 as having transpired and may be said to have been caused by effect of increased sudden tension to which the belt 15 is subjected in responding to an increase of load created in the driven machine 25. Now assume that the load returns to normal as rapidly as it was increased. Under this condition, all the components will return to their respective positions as shown in FIG. 4.

The belt now is not required to exert the same amount of force which it did when the load was increased, but the force exerted by the springs is the same as it was when the load was increased. Since the force now exerted by the springs is greater than that exerted by the belt, the carriage will be moved toward the front of the base. As the carriage is being moved, the springs begin to expand, and when they have expanded sufficiently so that the force that they then exert is equal to the force now being exerted by the belt, the carriage will come to rest.

Under these new conditions, the above described increment of rearward movement of the carriage reverses and the carriage has a return increment of movement forwardly in consequence of which the pulley side thereof moves forwardly and shortens the available length for fluid in the chamber of the right forward mechanism 33. The displaced liquid is forced through pipe 39 to the diagonally opposite mechanism 31 located at the rear of the carriage at the side thereof remote from the pulley and due to the pressure thus created in the chamber of that rearward mechanism, that side of the carriage is actuated forwardly in the same amount and direction as occurring at the pulley side of the carriage. Slue of the carriage in the return movement is therefore also prevented.

Of course as the chamber of the right forward mechanism 33 is shortened, as just described, the other forward chamber of mechanism 34 also shortens, but as the chamber of the diagonally opposite mechanism 32 at the rear of the pulley side of the carriage is being automatically lengthened by movement of the carriage, the fluid displaced by the forward mechanism 34 readily flows through pipe 40 to enter the available space being created in the said diagonally opposite rearward mechanism 32.

I claim:

1. A machinery base having a carriage with permitted forwardly and rearwardly movement, said carriage having relatively remote sides thereby providing a pair of diagonally opposite corners to the carriage of which one corner is forwardly and the other is rearwardly of said carriage at the said remote sides, a pair of intercommunicating cylinders of equal volume capacity reversely disposed with respect to each other at the diagonal corners, each with a communicating end, said cylinders being alike but with the cylinders of the diagonal pair being reversely directed with respect to each other and to the carriage, and each cylinder having one end only thereof communicating solely with its corresponding diagonally opposed cylinder, a communicating conduit from one said communicating end of one cylinder of said pair of diagonally opposed cylinders to the communicating end of the other cylinder of the pair, a piston having a piston-head directed toward said communicating end of its respective cylinder, the end areas of the piston head facing toward the respective communicating end of the containing cylinder being substantially equal to each other and to the cross-sectional area of the respective cylinder in which located, liquid being provided filling the communicating conduit and occupying cylinder space from one piston head to the other of the diagonal pair of cylinders in amount such that when one piston is close to said sole communicating end of its cylinder the other piston is remote from its said sole communicating end of its cylinder thereby establishing and maintaining a single-path continuity of liquid constantly effective as a controlled repetitiously responsive reversible operation by which liquid discharge initiated from one cylinder by movement of the carriage is introduced in equal entirely of volume into the receiving cylinder and will effect an equal relative movement of the piston in the receiving cylinder to the corresponding relative movement of the piston in the initiating cylinder, thereby obtaining a movement of the diagonally situated corner of the carriage progressively and precisely equal to and in the same direction as the movement initiated at the other end of the carriage and thereby preventing the carriage from sluing.

2. A machinery base in accordance with claim 1, wherein the aforesaid piston-cylinder control is duplicated in its entirety at the other two diagonal corners of the carriage, providing at least four cylinders all mechanically separate from each other arranged in diagonally situated pairs, each cylinder having a sole communicating end with a communicating conduit between said communicating ends of each pair of diagonally situated cylinders, said cylinders of each diagonal pair as well as the two directly opposed cylinders at each end of said carriage at the front and rear thereof having their said communicating ends reversely directed with respect to each other and to the carriage, thereby obtaining exactitude of movement and non-sluing of the carriage in direction of movement thereof both forwardly and rearwardly.

* * * * *